United States Patent
Ozanne et al.

(10) Patent No.: US 8,460,440 B2
(45) Date of Patent: Jun. 11, 2013

(54) BEVERAGE PRODUCTION DEVICE

(75) Inventors: Matthieu Ozanne, Champanges (FR);
Didier Vuagniaux, Gimel (CH);
Jean-Luc Thuliez, Le Landeron (CH);
Thierry Robert, La Chaux-de-Fonds (CH)

(73) Assignee: Nestec S.A., Vevey (CH)

( * ) Notice: Subject to any disclaimer, the term of this patent is extended or adjusted under 35 U.S.C. 154(b) by 323 days.

(21) Appl. No.: 12/991,593

(22) PCT Filed: May 7, 2009

(86) PCT No.: PCT/EP2009/055536
§ 371 (c)(1),
(2), (4) Date: Nov. 8, 2010

(87) PCT Pub. No.: WO2009/135899
PCT Pub. Date: Nov. 12, 2009

(65) Prior Publication Data
US 2011/0061534 A1 Mar. 17, 2011

(30) Foreign Application Priority Data
May 8, 2008 (EP) .................................... 08155882

(51) Int. Cl.
*B01D 19/00* (2006.01)
(52) U.S. Cl.
USPC .................. 95/260; 95/262; 96/207; 96/215; 96/220; 99/288; 99/290; 426/487
(58) Field of Classification Search
USPC ......... 95/260, 262; 96/207, 215, 220; 99/288, 99/290; 426/487
See application file for complete search history.

(56) References Cited

U.S. PATENT DOCUMENTS

| 3,778,976 | A  | * | 12/1973 | Pond ............................... 96/181 |
| 4,007,022 | A  | * | 2/1977  | Schleicher et al. ............. 95/243 |
| 6,860,992 | B2 | * | 3/2005  | Chau .............................. 210/251 |
| 8,182,586 | B2 | * | 5/2012  | Mahaffy ......................... 95/242 |
| 2002/0017193 | A1 | * | 2/2002 | Ramos ............................ 95/260 |
| 2011/0233144 | A1 | * | 9/2011 | McCabe .................. 210/748.16 |

FOREIGN PATENT DOCUMENTS

| EP | 1155721 | 11/2001 |
| EP | 1462040 | 9/2004 |
| WO | 02074684 | 9/2002 |
| WO | 02088580 | 11/2002 |
| WO | 2007042414 | 4/2007 |
| WO | 2008025730 | 3/2008 |

OTHER PUBLICATIONS

International Search Report PCT/EP2009/055536 mailing date Aug. 6, 2009, 2 pages.

* cited by examiner

*Primary Examiner* — Duane Smith
*Assistant Examiner* — Douglas Theisen
(74) *Attorney, Agent, or Firm* — K&L Gates LLP

(57) ABSTRACT

A beverage production device comprises a beverage production chamber designed to have a liquid interact with a beverage ingredient contained in a capsule, a liquid supply member for supplying liquid to the beverage production chamber, a heating member provided in the liquid supply member for heating the liquid, and an air separating compartment provided in the liquid supply member after the heating member for separating any air or other gas contained in the liquid. The air separating compartment comprises an inlet for introducing liquid into the air separating compartment, a member for breaking the kinetic energy of the liquid introduced through the inlet, a liquid outlet for evacuating liquid from the air separating compartment, and an air outlet for evacuating air from the air separating compartment.

13 Claims, 4 Drawing Sheets

BEVERAGE PRODUCTION DEVICE

The present invention relates to a beverage production device for preparing a beverage from a beverage ingredient provided to the device. More particularly, the invention relates to such a device comprising a beverage production chamber in which a liquid is made to interact with said beverage ingredient, the beverage ingredient particularly being contained in pre-portioned form in a closed capsule.

Devices for preparing a beverage by injecting, for instance, pressurized fluid to a capsule are well-known, especially in the field of producing tea, coffee or coffee type beverages. In addition, other substances such as chocolate or milk products can be extracted or dissolved to form a beverage. The advantages of such a system are in particular the conservation and freshness of the ingredients, as well as the possibility of facilitating the operations when preparing the beverage.

It should be understood that the interaction between the liquid and the ingredients within, for example, the capsule can be e.g. dissolving, extraction, brewing or any other interaction in order to prepare a beverage by means of ingredients provided within the capsule. Such a capsule is yet known from the patent documents WO 2007/042414 A1 and WO 2008/025730 A1 and mainly comprises an enclosure defined by a housing or shell and a filtering means.

When, for instance, preparing tea in such a device a problem occurs due to the presence of air in the liquid (e.g. water) being delivered to the capsule. This air mainly comes from the heating of the water which is carried out by a heater provided in the supply means for supplying the liquid to the beverage production chamber of the device. The air or air bubbles appear as soon as the liquid (water) temperature reaches about 70° C. The air is thus introduced with the liquid into the capsule but tends to not traverse the filter means (generally a paper filter) that is placed inside the capsule as described above. As in a low pressure water flow, which is present when preparing e.g. tea, there is no important stirring of water and of the product to be brewed (beverage ingredient like powder), the air bubbles can separate from the liquid, slowly raise to the top of the beverage production chamber like a capsule, for instance, and stay behind the filter inside the capsule. Their volume grows as long as water is injected inside the capsule. However, this volume can become so important that, for instance, the tea leaves are no longer properly immersed inside the liquid (water) and the tea can thus be not sufficiently extracted.

The present invention has been achieved in view of the above-mentioned drawbacks, and an object thereof is to provide a beverage production device having a reduced amount of air in the liquid used for extraction of the beverage ingredient.

According to a first aspect of the invention there is provided a beverage production device which comprises a beverage production chamber designed to have a liquid interact with a beverage ingredient contained in a capsule, liquid supply means for supplying liquid to said beverage production chamber, heating means provided in the liquid supply means for heating the liquid, and an air separating compartment provided in the liquid supply means after the heating means for separating any air or other gas contained in the liquid. The air separating compartment comprises an inlet for introducing liquid into the air separating compartment, means for breaking the kinetic energy of the liquid introduced through the inlet, a liquid outlet, separated from the inlet by the means for breaking the kinetic energy, for evacuating liquid from the air separating compartment, and an air outlet, also separated from the inlet by the means for breaking the kinetic energy, for evacuating air from the air separating compartment.

By means of the above described feature, an effectively decrease in liquid flow velocity arises when the liquid entering the air separating compartment. Hence, it is possible to reduce the liquid flow velocity such that air or gas is not carried along inside the liquid by the speed of the liquid, and the air can thus rise in order to be evacuated by the air outlet, and the separation of air from the heated liquid is realised.

According to a first embodiment of the present invention, the means for breaking the kinetic energy of the liquid introduced through the inlet is a porous wall. The porous wall can form a porous chamber inside the air separating compartment. In a preferred way the porous chamber presents a cylinder shape. The porous wall can be a sieve or a filter. By means of the above described features, it is possible to easily reduce the amount of air in heated liquid as the air is trapped in the meshes of the porous wall and can thus easily rise to an upper portion of the air separating compartment where it can be evacuated through the air outlet while the airless liquid can be evacuated through the liquid outlet.

A simple element having a common material can be used for separating air or other gas from a heated liquid as the gas is trapped in the meshes of said sieve or filter element. Preferably, the porous wall forms a porous chamber inside the air separating compartment. In order to have the liquid outlet and the air outlet separated from the inlet by the porous wall, the porous wall is preferably placed inside the air separating compartment so that it encircles the liquid inlet inside the air separating compartment thus forming the porous chamber. The porous chamber 41an present any shape. It is preferably a cylinder, the basis of which is the part of the air separating compartment sidewall surrounding the liquid inlet. Preferably, the longitudinal axis of the air separating compartment and the longitudinal axis of the porous chamber are substantially aligned. The liquid inlet can be provided at a substantially central position of the sidewall of the air separating compartment corresponding with the longitudinal axis of the air separating compartment and the porous chamber. By means of the above described feature a uniform inflow of the liquid into the air separating compartment and an equal distribution of the liquid inside the air separating compartment can be attained.

The porous chamber 41an be inclined with respect to horizontal axis, and its longitudinal axis raising according to the flow direction. By means of said feature, the separation of air and liquid can be easily achieved as the air can easily rise up to the highest portion of the air separating compartment while the liquid can simply be evacuated from a lower portion of the air separating compartment.

The air separating compartment preferably presents a volume sufficient to dampen the flow of the liquid entering in it. For this reason, it is preferred that the section area of the inlet and the section area of the air separating compartment are at a ratio of at least 1:10, preferably at least 1:100. Said sections are essentially perpendicular to the liquid flow direction either in the inlet or in the air separating compartment.

According to a second preferred embodiment, the means for breaking the kinetic energy of the liquid introduced through the inlet can be means for changing the direction of the liquid. Preferably, the means for breaking the kinetic energy of the liquid introduced through the inlet changes the direction of the liquid flow path to the opposite direction of the liquid at least twice. This change of direction of the liquid flow path to the opposite direction means that the direction of the liquid flow is essentially changed about an angle of 180°. More preferably, at least two changes to the opposite direction of the liquid flow path are provided by the specific design of the means for breaking the kinetic energy of the liquid. Accordingly, the fluid velocity can be effectively decreased. Such means can preferably be selected between baffles or a labyrinth flow path. Preferably, the fluid section through the means for breaking the kinetic energy of the liquid is increased each time there is a change of direction of the fluid flow path through said means.

According to the preferred embodiment, the means for breaking the kinetic energy of the liquid is a labyrinth formed by at least three concentrically arranged cylindrical members which are designed to force liquid provided by the inlet to meander from a centre portion of the labyrinth to a rim portion thereof. The cylindrical members can be arranged to form at least two interstitial spaces between the cylindrical members. Preferably, the interstitial spaces between the cylindrical members are gradually increased from the centre to the rim portion of the labyrinth. Preferably the larger cylindrical member is connected to the rim portion of the labyrinth by an orifice placed at the upper part of the larger cylindrical member. The upper part of the labyrinth rim portion is preferably connected to the air outlet and the bottom part of the labyrinth rim portion is connected to the liquid outlet.

According to a preferred aspect of the invention, the liquid outlet is provided with a first valve. By means of said valve, the value of the pressure at which the valve is opened can be set to a liquid pressure needed for the liquid to be supplied to the beverage production chamber and for beverage production. Hence, an additional backpressure valve in the liquid supply means before the beverage production chamber 41an be omitted.

According to another preferred aspect of the invention, the air outlet is provided with a second valve. By means of said valve, sufficient deaeration can be attained without any liquid escaping through said valve.

Preferably the value of pressure for opening the first valve is greater than that of the second valve. Then deaeration can already be accomplished before liquid is evacuated from the air separating compartment. Hence, the chance of separated air to be mixed again with airless liquid is reduced and thus, the liquid being supplied to the beverage production chamber merely contains a minimum of air or other gas. The value of pressure for opening the first valve can be at least 0.2 bar, preferably at least 0.4 bar. Thus, the liquid is supplied to the beverage production chamber at an appropriate pressure for beverage production.

The air outlet is usually arranged at a position higher than the liquid outlet with respect to the horizontal. Hence, air is prevented from being mixed with airless liquid again once it has been separated. This is achieved by the air outlet being arranged higher than the liquid outlet as air is lighter than liquid (e.g. water) and thus rises to an upper portion of the air separating compartment where it can easily be evacuated from the air separating compartment while the liquid can be evacuated through the liquid outlet arranged at a lower position. Preferably the air outlet is arranged at the highest vertical position of the air separating compartment with respect to the beverage production device. By means of said feature, as air rises up to the uppermost portion of the air separating compartment, a sufficient evacuation of air out of the air separating compartment can be attained. The liquid outlet can be arranged at the inlet sidewall of the air separating compartment. By means of this feature, the liquid is far distanced from the air outlet side, particularly when the air separating compartment is inclined.

Usually the inlet is connected to the heating means, the liquid outlet is connected to the beverage production chamber, and the air outlet is connected to a waste compartment or a breather means. Then the air separating compartment can be easily used in a common beverage production device for producing, e.g., tea.

In another preferred embodiment, the air separation compartment can further comprise an additional liquid outlet being equipped with a valve designed to eject liquid below a predefined temperature. Preferably, the additional liquid outlet is arranged at a lowermost portion of the air separating compartment. The air separating compartment preferably comprises two water outlets, one of which is provided with the already mentioned first valve to enable the ejecting of water at a predefined pressure. The second water outlet is preferably placed in vicinity of the first water outlet. Thereby, said second water outlet preferably enables a recirculation of the water in case the temperature is lower than the desired temperature for preparing a beverage. The second water outlet is preferably equipped with a valve in order to control the ejection of water through the second water outlet. Preferably, a two-way electrovalve is provided at the second water outlet which is held in an opened state as long as the water temperature is lower than the desired temperature for preparing a beverage. For measuring the water temperature within the air separating compartment, a dedicated temperature sensor may be provided which is preferably connected to the two-way electrovalve or a control unit connected to said electrovalve. The temperature sensor may be any internal or external means provided at the air separating compartment suitable for measuring the temperature of the liquid present in the compartment. The water which is ejected from said second water outlet is fed back into the water supply upstream of the air separating compartment. Preferably, the water ejected from said second water outlet is fed back into the water supply to the air separating compartment. According to that, the second water outlet enables the return of ejected water to the upstream side of the air separating compartment if the temperature of the water is not sufficient high to prepare a beverage. Once the water has reached a predefined temperature, the valve of the second water outlet is closed. Accordingly, the water pressure increases at the outlet of the air separating compartment and the water valve of the first water outlet opens when its opening pressure is reached.

In the first embodiment, the liquid outlet is preferably radially offset from the inlet with respect to a longitudinal axis of the air separating compartment. For this reason, the liquid outlet can easily be arranged in the air separating compartment and does not interfere with, e.g., the inlet. Besides, in the first embodiment the liquid outlet is preferably arranged below the lower porous face of the porous chamber with respect to the beverage production device. Hence, the airless liquid can be easily evacuated from the air separating compartment to be supplied to the beverage production chamber due to gravitation as a liquid like water is lighter than air and thus accumulates at a bottom of the air separating compartment while air accumulates at a top portion of the air separating compartment in a vertical direction with respect to the beverage production device.

In the second embodiment, the liquid outlet is preferably arranged at a portion of the labyrinth or baffle which is situated essentially below the air outlet with respect to the labyrinth or baffle. Thus, after the breaking of the kinetic energy by means of the labyrinth or baffle, air which accumulates at a higher portion of the labyrinth or baffle can be evacuated by means of the air outlet. Moreover, airless liquid which accumulates at a bottom portion of the labyrinth or baffle can be evacuated by means of the liquid outlet.

The air outlet is preferably generally arranged at a side opposite to the liquid inlet and the outlet side of the air separating compartment. By means of said feature, the air outlet and the liquid outlet are most distanced from each other and thus, mixing of airless liquid and air after being separated once is rather unlikely.

The invention also concerns a method for separating air from a heated liquid by the means of the above described air separating device.

Further features, advantages and objects of the present invention would come apparent for the skilled person when reading the following detailed description of embodiments of the present invention, when taking in conjunction with the figures of the enclosed drawings FIG. 1 is a schematic diagram of a beverage production device according to the present invention.

Figure 1:
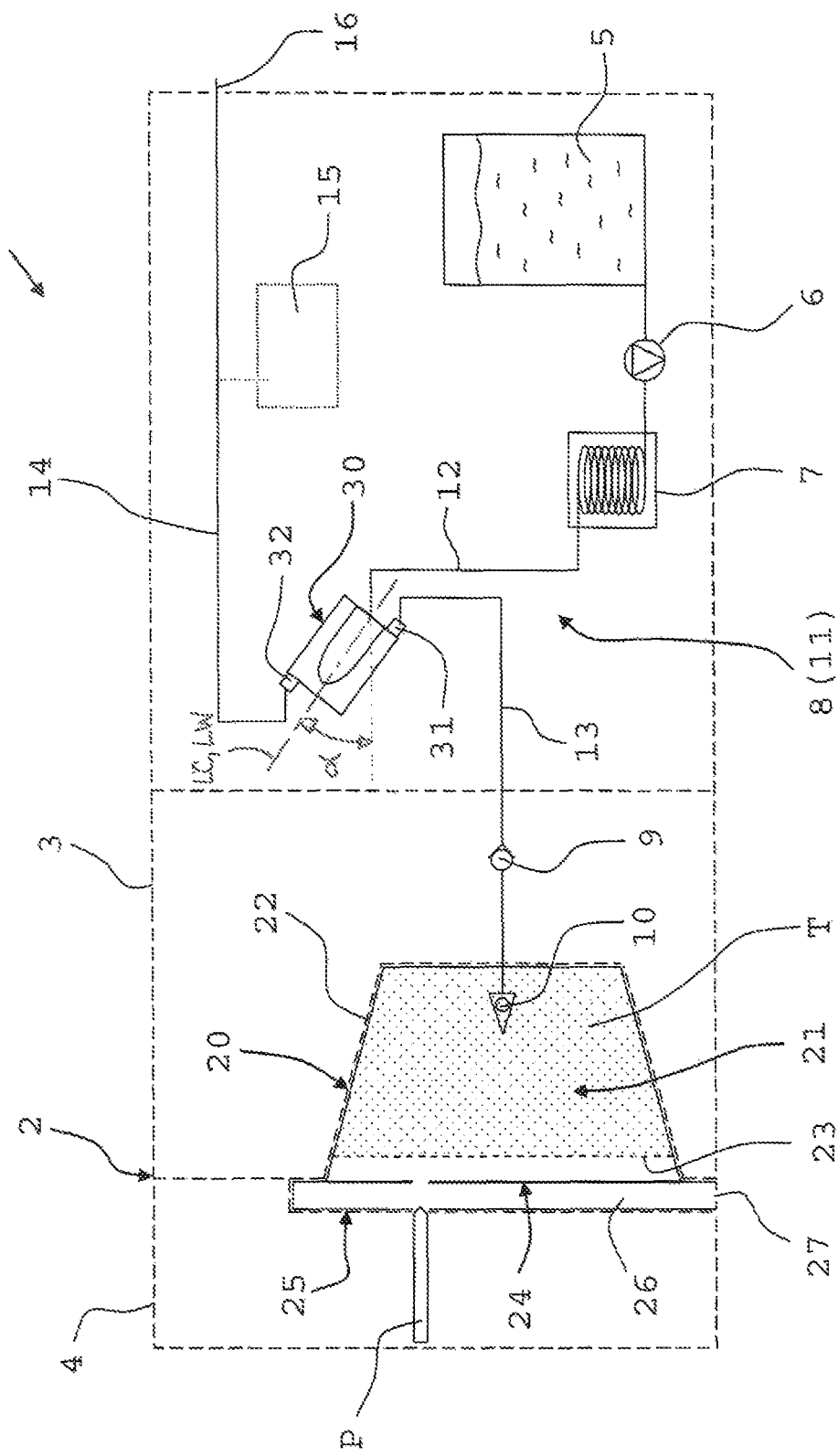

FIG. 1 shows a preferred embodiment of a beverage production device 1 according to the present invention. In said preferred embodiment a beverage ingredient T for preparing a beverage is enclosed in a capsule 20 or the like, also referred to as beverage production chamber, which is held in a handling means 2 comprising the handling members 3, 4. The capsule mainly comprises an enclosure 21 containing the beverage ingredients T such as leaf tea and the like. The enclosure 21 is preferably demarcated by a cup-shaped housing 22 and a filtering wall 23. The capsule is preferably closed by a sealing wall 24 that hermetically closes the enclosure 21. The capsule 20 can further comprise a cover 25 that is also attached to the housing 22 and overlaps the sealing wall 24. The cover 25 forms an internal channel 26 that terminates at its side end by an outlet 27. The cover 25 is preferably provided with a puncture indicating means in the form of a predefined hole or a weakened or breakable zone.

The beverage production device 1 may further comprise a means P for perforating the sealing wall 24 at an overflow location of the enclosure 21. As shown in FIG. 1, the perforating means P can be activated after closing of the handling members 3, 4 about the capsule 20. The perforating means P is forced or guided through the cover 25 through the puncture indicating means such as a hole having a diameter slightly larger than the perforator P. The perforator P can engage the sealing wall 24 in puncturing to create an overflow aperture and then is retracted away from the aperture to leave the aperture fully open. The perforator P can be driven by a solenoid or any other equivalent drive means or even manually.

Notwithstanding the above description, the capsule 20 is not limited to any size or design, and there can also be used any other known beverage ingredient storage means or beverage production chambers also comprising a filter element for preparation of a beverage by extraction of beverage ingredients with heated liquids, preferably heated low-pressure liquids. In the following, liquid stands for all kinds of liquids for being used in a beverage production device as, for instance, water.

The beverage production device 1 of said embodiment further comprises a liquid reservoir 5, such as a water tank, a liquid pump 6, a heating means 7, such as a heater, and a liquid supply line 8, also referred to as liquid supply means. The beverage production device 1 may also comprise a controller and a user interface board (not shown) to manage the beverage preparation cycles as known in the art. Moreover, a back-pressure valve 9 can be provided to lower the pressure at the entry side or injection member 10 in the beverage production chamber 20. The injection member 10 can preferably be a needle(s) or blade(s) and a liquid inlet. Instead of the back-pressure valve 9 a low pressure pump can be used that delivers the fluid at low pressure.

The liquid supply means 8 preferably comprises, amongst others, a hot liquid supply line 11 which is arranged between the heating means 7 and the beverage production chamber 20 for supplying the hot liquid into the beverage production chamber 20 for beverage preparation/extraction.

In the hot liquid supply line 11 there is provided an air separating means 30, also referred to as air separating compartment, which preferably divides the hot liquid supply line 11 into a first line 12 delivering hot liquid containing air to the air separating compartment 30 and a second line 13 for supplying hot liquid without air to the beverage production chamber 20. The air separating compartment 30 and its function are described later on.

The second line 13 is preferably joined to the air separating compartment 30, and more preferably joined thereto via a first valve 31. The first valve 31 can be of any known valve type used in such beverage production devices as, for instance, a check valve. Said valve is preferably designed such that it opens at a predetermined threshold pressure value. Said threshold pressure value for opening the first valve 31 can, for instance, be at least 0.2 bar, more preferably at least 0.4 bar. Hence, the liquid is supplied to the beverage production chamber 20 at an appropriate pressure for beverage production and the backpressure valve 9 can be omitted.

The beverage production device 1 does also preferably comprise an air outlet line 14 for delivering air from the air separating compartment 30 to a waste compartment 15 and/or a breather means 16. It has to be noted that the term "air" is used substitutionally for any kind of gases and is not limited to air. The air outlet line 14 is joined preferably to the air separating compartment 30, and more preferably joined thereto via a second valve 32. The second valve 32 is designed such that the valve 32 stays open when air is present in front of the valve but the valve 32 is closed immediately in case liquid appears. Such valve type is commonly known in the state of the art (cf. WO 02/088580 A1) and provides a sufficient deaeration without any liquid escaping through said valve. In a preferred embodiment of the invention the value of pressure for opening the first valve 31 is greater than the value of pressure for opening the second valve 32 such that deaeration can already be accomplished before liquid is evacuated from the air separating compartment 30. Hence, the chance of separated air to be mixed again with airless liquid is reduced and thus, the liquid being supplied to the beverage production chamber 41 contains a minimum of air.

In the following the air separating compartment 30 will be described in relation to FIG. 2.

Figure 2:
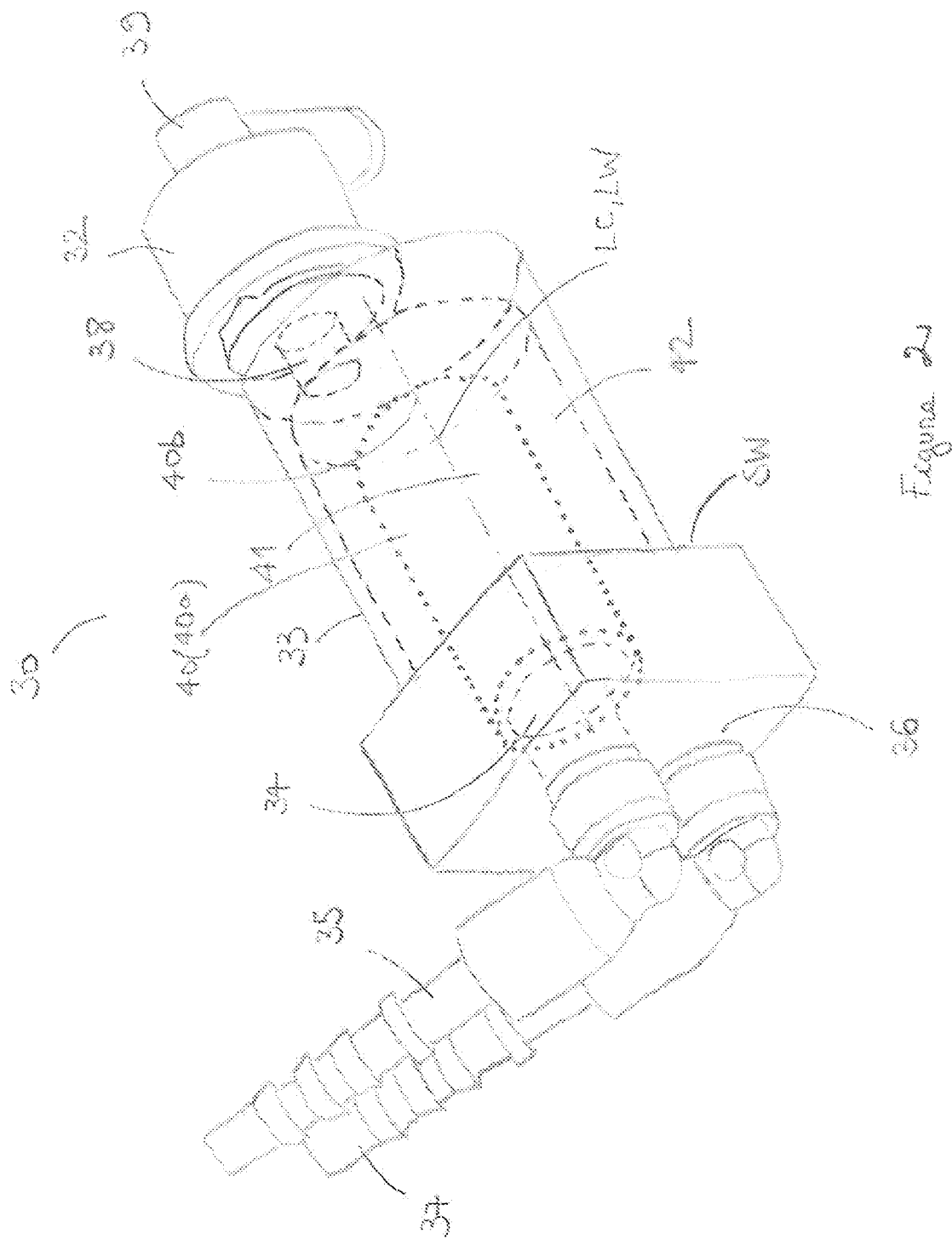
FIG. 2 shows an air separating means of the beverage production device according to the first embodiment of the present invention in perspective top view.

According to the first preferred embodiment illustrated in FIG. 2, the air separating compartment 30 preferably comprises a housing 33 having a cylindrical shape but is not limited thereto. The air separating compartment 30 preferably further presents: an inlet opening 34 connected with an inlet 35 which is joined to the first line 12 and thus connected to the heating means 7, a liquid outlet opening 36 connected with a liquid outlet 37 which is joined to the second line 13 and thus connected to the beverage production chamber 20, and an air outlet opening 38 connected with an air outlet 39 which is joined to the air outlet line 14 and thus connected to the waste compartment 15 or breather means 16. The first valve 31 is preferably arranged in-between the air separating compartment 30 and the liquid outlet 37, but can also be arranged downstream in the second line 13. The second valve 32 is preferably attached to the air separating compartment 30 in-between the air outlet opening 38 of the air separating compartment 30 and the air outlet 39. Hence, a suitable deaeration can be attained as no liquid may enter the air outlet 39 at all and no air may enter the liquid outlet 37.

Figure 3:
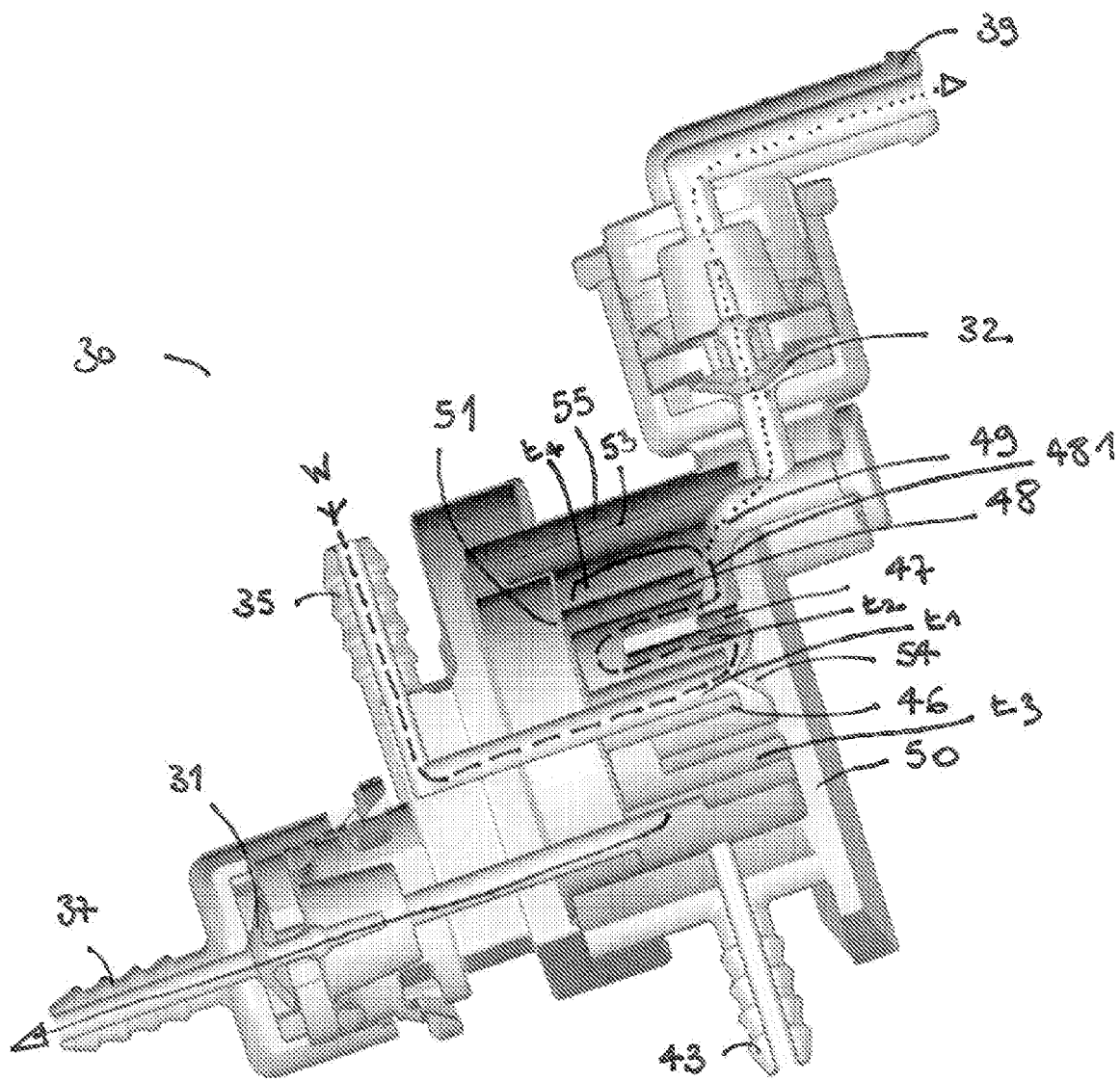
FIG. 3 shows the second preferred embodiment of the air separating means according to the present invention in sectional side view.

Inside the air separating compartment 30 means for breaking the kinetic energy of the liquid introduced through the inlet 35 is provided. In said preferred embodiment as shown in FIG. 2 said means for breaking the kinetic energy of the liquid introduced through the inlet 35 is a wall 40, in the following also referred to as porous wall. Alternatively or additionally, said means for breaking the kinetic energy of the liquid introduced through the inlet 35 may also be means for changing the direction of the liquid, such as, for instance, a baffle or a labyrinth as shown in FIG. 3.

The wall 40, however, preferably extends from a sidewall SW of the air separating compartment 30 to the inside thereof. The sidewall SW preferably is one of the top or bottom wall of the preferably cylindrical air separating compartment 30. The liquid outlet 37 and the air outlet 39 are separated from the inlet 35 by said porous wall 40. Therefore, the porous wall 40 is preferably placed inside the air separating compartment 30 so that it encircles the inlet opening 34. Hence, the air separating compartment 30 is preferably divided into at least two portions which are a first space 41 to which the inlet 35 is connected, and a second space 42 to which the liquid outlet 37 and the air outlet 39 are connected. The first space 41 inside the wall 40 is thus preferably demarcated by the wall 40 and the sidewall SW of the air separating compartment 30. The second space 42 is provided between the outside of the wall 40 and the air separating compartment 30, i.e., the housing 33.

The wall 40 is preferably made of a porous material which can be any of a variety of materials compatible with the delivery of food, such as, but not limited to, plastic foil, non-woven polyester, polypropylene, polyethylene, paper materials, sintered materials, and combinations thereof. The porous wall 40 thus serves as a sieve or a filter element such that air or other gas contained in the heated liquid can be simply filter out of said liquid by being trapped in the porous material/the meshes of the wall 40.

The porous material of the wall 40 can preferably further be designed such that it creates a slight resistance which enables the homogenization of the pressure in the first space 41 and an equal repartition of the flow on all the surface of the wall 40.

The wall 40 preferably forms a porous chamber 41 inside the air separating compartment 30 enclosing the first space 41 identified by a dotted line in FIG. 2. The term "porous chamber" is confined to a chamber 41 comprising a porous wall. The porous chamber 41 can present any shape. This porous chamber 41 is preferably a cylinder or bell-shaped having a substantially cylindrical main body portion 40a and a hemispherical end portion 40b at the opposite end of the sidewall SW. The basis of which is the part of the air separating compartment sidewall SW surrounding the inlet 35. Thus, the separation of air or other gas out of the heated liquid can be enhanced as gas which is trapped in the meshes of the porous wall 40 can be simply separated from the liquid, and due to the bell-like shape of the wall 40 the air may then easily collate together forming a big bubble that can no more be withheld by the mesh of the wall 40 and can thus easily rise to the highest vertical point of the air separating compartment 30.

In a preferred embodiment the longitudinal axis LC of the air separating compartment 30 and the longitudinal axis LW of the preferably bell-shaped or cylindrical wall 40 or porous chamber 41 are substantially aligned. Hence, a uniform inflow of the liquid into the air separating compartment 30 and an equal distribution of the liquid inside the air separating compartment 30 can be attained.

As already mentioned above, the first space 41 is preferably connected to the inlet 35 via the inlet opening 34 preferably being provided in the sidewall SW of the air separating compartment 30 for introducing hot liquid heated by the heating means 7 into the wall 40. The inlet opening 34 is thus preferably provided at a substantially central position of the sidewall SW of the air separating compartment 30 corresponding with the longitudinal axes LC, LW of the air separating compartment 30 and the porous chamber 41 for enhancing a uniform inflow of the liquid into the first space 41, which is further enhanced by the alignment of the air separating compartment 30 and the wall 40 or porous chamber 41. The liquid inlet can be provided at a substantially central position of the sidewall of the air separating compartment corresponding with the longitudinal axis of the air separating compartment and the porous chamber The second space 42 is preferably connected to the liquid outlet 37 via the liquid outlet opening 36 for evacuating liquid from the air separating compartment 30, and to the air outlet 39 via the air outlet opening 38 for evacuating air from the air separating compartment 30. In a preferred embodiment the liquid outlet 37 is arranged at the inlet side that is at the sidewall SW of the air separating compartment 30. Additionally, the air outlet 39 is preferably arranged at a side of the air separating compartment 30 opposite to the liquid outlet side. Hence, the separation of air and liquid is enhanced, and the air may not be mixed into the liquid again once it has been separated therefrom and entered the second space 42, as the air is evacuated at a distal end of the air separating compartment 30 with respect to the liquid outlet 37 in the sidewall SW.

The air outlet 39 or air outlet opening 38 is preferably arranged at a position higher than the liquid outlet 37 or liquid outlet opening 36 with respect to the horizontal. Preferably, the liquid outlet 37 is arranged below the lower face of the wall 40 with respect to the horizontal, and the air outlet 39 is arranged above the upper face of the wall 40 with respect to the horizontal. In a most preferable embodiment of the invention, the liquid outlet 37 is arranged at the lowermost portion, i.e. the lowest vertical position, of the air separating compartment 30 with respect to the beverage production compartment 1, and the air outlet 39 is arranged at the uppermost portion, i.e. the highest vertical position, of the air separating compartment 30 with respect to the beverage production compartment 1. Hence, as air being lighter than the used liquid (e.g. water), the air accumulates at the highest portion of the air separating compartment 30 in the second space 42 thus being next to the air outlet opening 38 from where the air can easily be evacuated through the second valve 32 while the airless liquid can be evacuated through the first valve 31 at a distal end of the air separating compartment 30 with respect to the air outlet opening 38 such that air and liquid cannot be mixed again, and the liquid thus contains only a minimum of air.

Alternatively or additionally, at least the porous chamber 41 (or better its longitudinal axis LW) inside the air separating compartment 30 or the air separating compartment 30 together with the porous chamber 41 can preferably be inclined by an angle α (cf. FIG. 1) with respect to the horizontal such that the inlet 35 is arranged at a lower side of the inclined porous chamber 41 and thus at a lower position with respect to the hemispherical end portion 40b of the porous chamber 41 and the air outlet 39. In specific embodiment the wall 40 or porous chamber 41 is in an upright position with respect to the beverage production device 1, i.e. the angle α equals 90°, and the inlet 35 is arranged at a bottom portion of the air separating compartment 30 such that the sidewall SW forms the bottom portion of the air separating compartment 30, and the air outlet 39 is arranged at a top portion of said air separating compartment 30. Hence, the separation of air or gas and liquid can be easily achieved as the air can easily rise up to the highest portion of the air separating compartment 30 while the liquid can simply be evacuated from the bottom portion (the sidewall SW) of the air separating compartment 30, and air is thus most distanced to the liquid outlet 37 in the second space 42. Additionally, the coalescence of air or gas is enhanced when being trapped in the meshes of the wall 40 as the air bubbles can easily slide to the top of the wall 40 where they easily form the big air bubble which easily loosens from the wall 40 due to the preferred hemispherical shape of the top end portion 40b of the porous chamber 41 and can thus rise to the highest vertical position of the air separating compartment 30.

The section area of the inlet 35 and the section area of the porous wall 40 or porous chamber 41 or air separating compartment 30 are preferably at a ratio of at least 1:10, more preferably at least 1:100, such that an effectively decrease in liquid flow velocity arises when liquid entering the first space 41. Said sections are essentially perpendicular to the liquid flow direction either in the inlet 35 or in the air separating compartment 30. In a preferred embodiment, the inlet pipe diameter is 2 mm (area of 3.15 mm$^2$) and the porous wall 40 presents a section area of at least 500 mm$^2$. However, the invention is not limited thereto. Hence, the air separating compartment 30 preferably presents a volume sufficient to dampen the flow of the liquid entering in it. By means of said feature it is thus possible to reduce the liquid flow velocity such that air is not carried along by the liquid due to its speed, and the air (bubbles) can thus rise in order to be then trapped in the meshes of the wall 40 where they can hang on the porous surface. When being trapped once, the air collates to a big bubble which then rises to the uppermost portion of the housing next to the air outlet 39 from where it can then be evacuated. Hence, due to the decrease of the liquid flow velocity, the separation of air from the heated liquid is further enhanced. It has to be noted that the mentioned ratio must be simply such big that a decrease in liquid flow velocity is obtained which suffices the gas to be separated from the liquid by use of the porous wall 40 as described above.

Next, a method for separating air from a liquid in a beverage production device 1 according to the invention is described in relation with the first embodiment of FIG. 2, yet this method is also applicable in relation with the second embodiment of FIG. 3.

A liquid contained in the liquid reservoir 5 is pumped by means of the liquid pump 6 via the liquid supply means 8 through the heating means 7 in which the liquid is heated up to a preferred temperature. The heated liquid is then further supplied through the first line 12 of the hot liquid supply line 11 of the liquid supply means 8 to the inlet 35 of the air separation compartment 30. The liquid then enters the first space 41 demarcated by the porous wall 40 and the sidewall SW forming the porous chamber 41 inside the air separating compartment 30 through the inlet opening 34 formed in said air separation compartment 30. When entering said first space 41, i.e. the porous chamber 41, the velocity of the liquid containing air is preferably decreased via means for breaking the kinetic energy of the liquid introduced through said inlet 35. This can preferably be accomplished by the section area of the inlet 35 and the section area of the porous chamber 41 or air separating compartment 30 being at a ratio of at least 1:10, preferably at least 1:100. However, it is also possible that the means for breaking the kinetic energy of the liquid introduced through the inlet are means for changing the direction of the liquid, such as, for instance, a baffle or a labyrinth flow path such as described in FIG. 3. Due to the decrease in liquid flow velocity the air bubbles are able to rise to an upper face of the wall 40 or porous chamber 41 and can be separated from the liquid by being trapped in the material of the wall 40.

At the border or interface between the first space 41 and the second space 42 formed by the porous chamber 41 or wall 40, bubbles are thus trapped in the mesh of the filter-like porous wall 40. With time, the air or gas bubbles collate together forming a big bubble that cannot longer be withheld by the mesh of the wall 40. A porous chamber 41 having a bell shape is thus preferable as the air or gas can easily slide on the wall 40 to its tapered top end portion 40b where it can easily form the big bubble which easily loosens from the wall 40 as already described above. This bubble then rises to the highest vertical point of the air separating compartment 30 inside the second space 42 where, in a preferred embodiment, the air outlet valve 32 is positioned at the air outlet opening 34.

In the meantime, the liquid pours out of the first space 41 through the porous wall 40 into the second space 42 between the wall 40 and the air separating compartment 30, i.e. the housing 33, and as the air or gas is totally trapped in the meshes of the wall 40 and then risen to the uppermost portion of the air separating compartment 30, the liquid in the second space 42 does not contain any air bubbles. The second space 42, i.e. the space between the air separating compartment 30 and the wall 40, is thus filled with liquid not comprising air bubbles, except at the vicinity of the air outlet 39 (valve 32).

In a preferred embodiment, when the pressure inside the air separating compartment 30 exceeds a predetermined pressure value which is less than the pressure value for opening of the first valve 31, the second valve 32 opens and the air bubble(s) escape(s) from the air separating compartment 30. During this, the second valve 32 is closed every time when liquid appears at the air outlet 39 such that sufficient deaeration can always be accomplished while no liquid is getting lost. The air evacuated through the second valve 32 from the second space 42 is then preferably supplied to the ambience of the beverage production device 1.

When the pressure inside the air separating compartment 30 exceeds the predetermined pressure value for opening the first valve 31, the liquid (without air) contained in the second space 42 of the air separating compartment 30 is evacuated through the liquid outlet 37. As the air outlet opening 38 is preferably arranged at a position higher than the liquid outlet opening 36, the air can be sufficiently separated from the liquid and thus, the liquid being evacuated from the air separating compartment 30 through the liquid outlet 37 to be used for beverage preparation in the beverage production chamber 20 does not or not importantly contain air or other gas therein.

In case the pressure drops under the threshold pressure value for opening of the first valve 31, said first valve 31 is closed again until the threshold pressure value is exceeded again.

The liquid without air is then supplied through the second line 13 to the beverage production chamber 20 of the beverage production device 1 and injected into the beverage production chamber 20 via the injection member 10. In the beverage production chamber 20 a beverage is made by extraction of the beverage ingredient T with airless liquid in the beverage production chamber 20. As no or merely a minimum amount of air is contained in the liquid (e.g. water), there is no or no important amount of air or gas staying behind the filter wall 23 inside the beverage production chamber 20 such that the beverage ingredients T are well immersed inside the liquid all the time and the beverage, like tea, can be sufficiently extracted from beverage ingredients like tea leaves.

Figure 4:
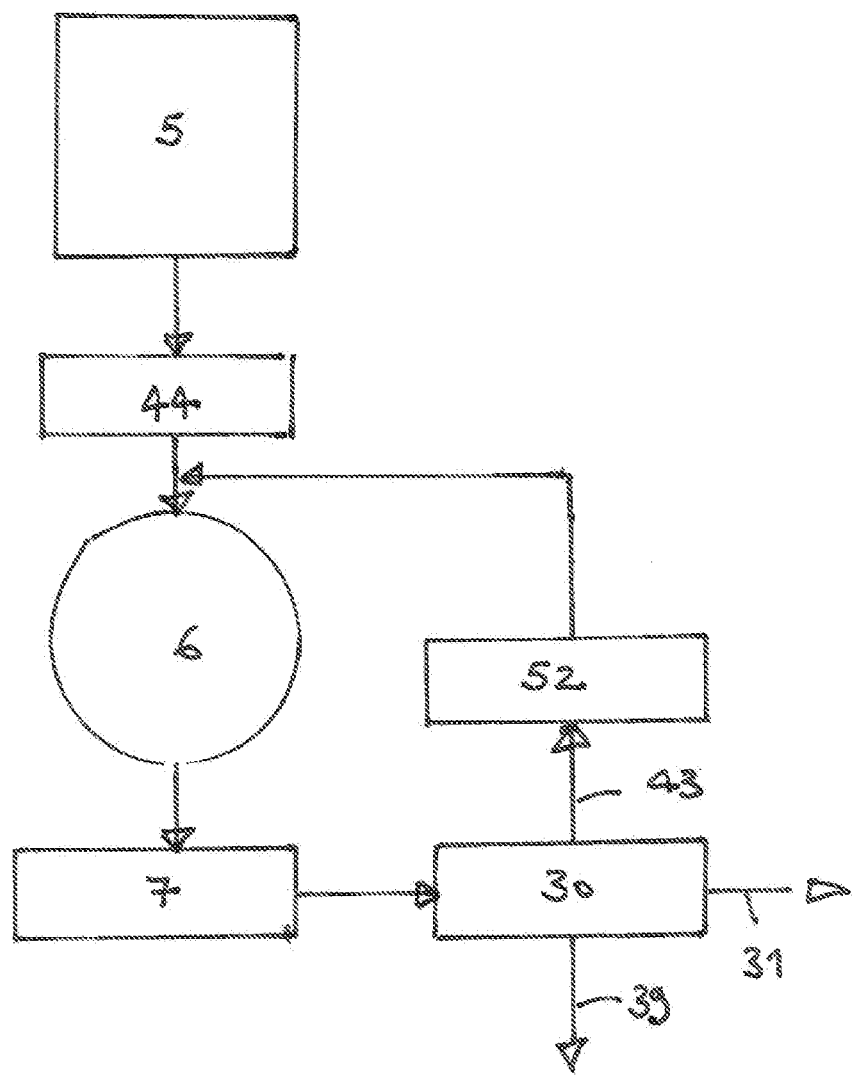
FIG. 4 shows a schematic diagram of a beverage preparation device comprising the air separating means according to FIG. 3.

With reference to FIGS. 3 and 4, the second preferred embodiment of the air separating compartment 30 according to the present invention will be explained in the following. On FIG. 3, the air separating compartment 30 is represented such as oriented inside the beverage preparation machine that is inclined relative to the horizontal in order to improve the evacuation of gas bubbles from heated water.

As can be seen in FIG. 3, the air separating compartment 30 is of essentially cylindrical foam, wherein the inside of the compartment 30 is formed as a labyrinth 55. Thereby, heated water is provided to a baffle 54 of the labyrinth 55 by means of the water inlet 35. The labyrinth is formed by at least three engaging cylindrical members 46, 47, 48 extending from planes 50, 51 of the air separating compartment 30. The planes 50, 51 are preferably essentially perpendicular arranged to the longitudinal centre axis of the air separating compartment 30 and particularly of the labyrinth 55. The three engaging cylindrical members 46, 47, 48 present lengths inferior to the distance between the planes 50 and 51 and are placed head to food so that water reaching the end of a cylinder, 46 for example, can enter in the following larger cylinder, 47 for example, and circulated through said larger cylinder. The larger cylinder 48 is preferably in fluid connection with the labyrinth rim portion through an orifice 481 placed on its upper part in order to accentuate the separation of the gas and the water.

The liquid inlet 35 is preferably connected to the inner cylindrical member 46 presenting an inside space $t_1$. The centre portion of the labyrinth 55 can comprise the baffle 54 arranged between the inner cylindrical member 46 and the second cylindrical member 47. The baffle 54 is preferably designed to deflect liquid provided by the inlet 35 to the interstitial space $t_2$ between the inner cylindrical member 46 and the second cylindrical member 47. Said interstitial space $t_2$ is in fluid connection with the interstitial space $t_3$ provided between the second and the third cylindrical member 47, 48. Thereby, the interstitial spaces $t_2$ and $t_3$ are demarcated by the plane 51 of the air separating compartment 30 which is designed to act as a deflecting member for enabling liquid to flow from the inner interstitial space $t_2$ to the second interstitial space $t_3$ of the labyrinth 55. As the cylindrical members 46, 47, 48 are arranged concentrically to each other, the interstitial spaces $t_1$, $t_2$, $t_3$ therebetween enable a change of the direction of the liquid flow path W to the opposite direction at least twice within the labyrinth 55. The interstitial space $t_3$ is in fluid connection with the external part of the larger cylindrical member 48 through the orifice 481 placed at the upper part of said larger cylindrical member 48. The labyrinth 55 presents at its upper portion an outlet 49 so that air which is lighter than liquid is enabled to escape from the labyrinth to an upper portion thereof, at which the air outlet 39 is connected to the labyrinth. The rise of the air within the air separating compartment 30 is depicted by dots A in FIG. 3. In FIG. 3, the flow path W of the mixture of water and air introduced into the air separating compartment 30 is illustrated by a dashed line and the flow path of water from which air ahs been eliminated is illustrated by a continuous line. Accordingly, the water is provided to the centre portion of the labyrinth and is then forced to meander between the cylindrical members 46, 47, 48. Thereby, as the cylindrical members are arranged concentrically, the direction of the flow path W of the water is changed at least twice to the opposite direction.

Hence, the kinetic energy of the liquid provided to the air separating compartment can be effectively reduced. Moreover, the fluid section through the labyrinth is preferably increased each time there is a change of direction in order to reduce the fluid velocity. Accordingly, the interstitial spaces $t_1$, $t_2$, $t_3$ inside and between the cylindrical members 46, 47, 48 are preferably gradually increased from the baffle 54 to the rim portion 53 of the labyrinth. Thereby, a last interstitial space $t_4$ is preferably arranged between the third cylindrical member 48 and the rim portion 53 of the labyrinth 55. Said interstitial space $t_4$ is preferably larger than the interstitial space $t_3$ which in turn is preferably larger than the interstitial space $t_2$, which in turn is preferably larger than the internal space $t_1$. The sizes of the interstitial spaces $t_1$, $t_2$, $t_3$, $t_4$ of the labyrinth 55 preferably each differ about 5 to 50 percent. As the external cylinder 48 is only opened to the interstitial space $t_4$ through the upper outlet 481, the water flow path flows down in the interstitial space $t_4$ to reach the bottom portion of the air separating compartment 30 where the liquid outlet 37 is arranged in fluid connection to the interstitial space $t_4$. Thereby, the liquid outlet 37 is equipped with a valve 31 which opens if a predefined pressure is reached within the air separating compartment 30 as already outlined with respect to the first preferred embodiment. In addition, a second liquid outlet 43 is arranged at the bottom or lowermost portion of the air separating compartment 30, said second liquid outlet 43 being also in fluid connection to the interstitial space $t_4$. Said second outlet 43 is equipped with a two-way electrovalve which is preferably connected to a temperature sensor (not shown) which measures the temperature of the water within the air separating compartment 30. The two-way electrovalve is preferably designed to close the valve only if a predefined temperature of the water within the compartment 30 is reached. Hence, if the water has not yet reached a desired temperature for preparing the beverage, the second water outlet 43 is in its open state. Water ejected from the second outlet valve 43 is preferably provided to an upstream side of the pump 6 of the beverage preparation device (cf. FIG. 4). Accordingly, a recirculation of water which has not yet reached the desired temperature is enabled. The preferred temperature for the beverage preparation is between 70° and 95° C. Preferably, as shown in FIGS. 3 and 4, the first and second water outlets 37, 43 are placed at the lowest portion of the labyrinth and the air outlet 39 is connected to the highest portion of the labyrinth. Thus, the separation of water and air by gravity is enabled. Moreover, since the air outlet 39 is arranged at a position higher than the liquid outlets 37, 43 with respect to the horizontal of the air separating compartment 30, air is prevented from being mixed with airless water again once it has been separated. The implementation of these valves can also happen with the first embodiment of the air separating compartment comprising a porous chamber.

FIG. 4 shows the fluid path of the water in a preferred embodiment of the beverage preparation device according to FIG. 3. However implementation with the first embodiment of the air separating compartment comprising a porous chamber is also possible. Hence, the water which is provided by external or internal water supply means 5, such as for example a water tank, to the heating means 7. Thereby, the pump 6 and an optional flow meter 44 are provided between a water filter and the heating means 7. Heated water is then provided to the air separating compartment 30. In case the water has not yet reached a desired temperature, the two-way electrovalve 52 of the second water outlet 43 opens such that the water is recirculated to the inlet side of the pump 6. Preferably, the water ejected from the water outlet 43 is provided to the upstream side of the flow meter as depicted in FIG. 4. Hence, water which is too cold for the beverage preparation process does not have to be ejected into a drip tray or the like.

Although the present invention has been described with reference to preferred embodiments thereof, many modifications and alternations may be made by a person having ordinary skill in the art without departing from the scope of this invention which is defined by the appended claims. For example, the air separation device may be used in any kind of beverage production device known in state of the art which uses heated liquid for preparation of a beverage using beverage ingredients to be extracted.

REFERENCE SIGN LIST

1 . . . beverage production device
2 . . . handling means
3, 4 . . . handling member
5 . . . reservoir
6 . . . pump
7 . . . heating means (heater)
8 . . . supply means
9 . . . backpressure valve
10 . . . injection member
11 . . . hot liquid supply means
12 . . . first line
13 . . . second line
14 . . . air outlet line
15 . . . waste compartment
16 . . . breather means
20 . . . beverage production chamber (capsule)
21 . . . enclosure
22 . . . housing (of the capsule)
23 . . . filtering wall
24 . . . sealing wall
25 . . . cover
26 . . . internal channel
27 . . . outlet
30 . . . air separating compartment
31 . . . first valve
32 . . . second valve
33 . . . housing (of the air separation means)
34 . . . inlet opening
35 . . . inlet
36 . . . liquid outlet opening
37 . . . liquid outlet
38 . . . air outlet opening
39 . . . air outlet
40 . . . (porous) wall
40a . . . main body portion (of the porous chamber)
40b . . . end portion (of the porous chamber)
41 . . . first space (inside of the wall), porous chamber
42 . . . second space (space between the outside of the wall and the housing)
43 . . . second water outlet
44 . . . flow meter
46 . . . first cylindrical member
47 . . . second cylindrical member
48 . . . third cylindrical member
481 . . . third cylindrical member upper orifice
49 . . . outlet
50, 51 . . . planes (perpendicular to cylindrical compartment 30)
52 . . . two-way electrovalve
53 . . . rim portion of labyrinth 55
54 . . . baffle
55 . . . labyrinth
A . . . air flow path
LC . . . central axis of the air separating compartment
LW . . . central axis of the wall
P . . . perforating means
SW . . . sidewall (of the air separating compartment)
T . . . beverage ingredient
W . . . water flow path

The invention claimed is:

1. A beverage production device comprising:
a beverage production chamber designed to allow a liquid to interact with a beverage ingredient;
liquid supply member for supplying liquid to the beverage production chamber;
heating member provided in the liquid supply member for heating the liquid; and
an air separating compartment located in the liquid supply member after the heating member for separating air or other gas contained in the liquid, the air separating compartment comprises: an inlet for introducing liquid into the air separating compartment, means for breaking the kinetic energy of the liquid introduced through the inlet by changing the direction of the liquid; a liquid outlet, separated from the inlet by the means for breaking the kinetic energy, for evacuating liquid from the air separating compartment; and an air outlet, also separated from the inlet by the means for breaking the kinetic energy, for evacuating air from the air separating compartment, the means for breaking the kinetic energy of the liquid introduced through the inlet changes the direction of the liquid flow path to an opposite direction at least twice.

2. The device according to claim 1 wherein the means for breaking the kinetic energy of the liquid introduced through the inlet is selected from the group consisting of a baffle and a labyrinth.

3. The device according to claim 2, wherein the labyrinth is formed by at least three concentrically arranged cylindrical members which are designed to cause liquid from the inlet to meander from a center portion of the labyrinth to a rim portion thereof.

4. The device according to claim 3, wherein the cylindrical members are positioned to form at least two interstitial spaces between the cylindrical members.

5. The device according to claim 4, wherein the interstitial spaces between the cylindrical members gradually increase from the center to the rim portion of the labyrinth.

6. The device according to claim 3, wherein a larger cylindrical member is connected to the rim portion of the labyrinth by an orifice located at an upper part of the larger cylindrical member.

7. The device according to claim 3, wherein an upper part of the labyrinth rim portion is connected to the air outlet and a bottom part of the labyrinth rim portion is connected to the liquid outlet.

8. The device according to claim 1, wherein the liquid outlet is provided with a first valve and the air outlet is provided with a second valve.

9. The device according to claim 8, wherein the pressure required for opening the first valve is greater than that of the second valve.

10. The device according to claim 1, wherein the air outlet is located at a higher position than the liquid outlet.

11. The device according to claim 1, wherein the air separating compartment comprises an additional liquid outlet having a valve that is designed to eject liquid below a predefined temperature.

12. The device according to claim 11, wherein the additional liquid outlet is located at a lowermost portion of the air separating compartment.

13. A method for separating air from a heated liquid in a beverage production device, comprising the steps:
- supplying heated liquid through an inlet into an air separating compartment,
- decreasing the flow velocity of the heated liquid using means for breaking the kinetic energy of the liquid by changing the direction of the liquid to an opposite direction at least twice,
- evacuating liquid from the air separating compartment through a liquid outlet of the air separating compartment, the liquid outlet being separated from the inlet by the means for breaking the kinetic energy, and
- evacuating air from the air separating compartment through an air outlet, the air outlet being separated from the inlet by the means for breaking the kinetic energy.

\* \* \* \* \*